United States Patent
Suzuki

(10) Patent No.: US 10,144,362 B2
(45) Date of Patent: Dec. 4, 2018

(54) INSTRUMENT PANEL

(71) Applicant: TOYOTA JIDOSHA KABUSHIKI KAISHA, Toyota-shi, Aichi-ken (JP)

(72) Inventor: Manami Suzuki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/670,326

(22) Filed: Aug. 7, 2017

(65) Prior Publication Data

US 2018/0086282 A1 Mar. 29, 2018

(30) Foreign Application Priority Data

Sep. 23, 2016 (JP) ................. 2016-185786

(51) Int. Cl.
| | | |
|---|---|---|
| G12B 9/00 | (2006.01) |
| B60R 11/02 | (2006.01) |
| B60K 37/02 | (2006.01) |
| G02F 1/1333 | (2006.01) |

(52) U.S. Cl.
CPC .......... B60R 11/0235 (2013.01); B60K 37/02 (2013.01); *B60K 2350/1028* (2013.01); *B60K 2350/941* (2013.01); *G02F 1/133308* (2013.01)

(58) Field of Classification Search
CPC ................ B60R 11/0235; B60K 37/02; B60K 2350/1028; G02F 1/133308
USPC ....................................................... 248/27.1
See application file for complete search history.

(56) References Cited

U.S. PATENT DOCUMENTS

| | | | | |
|---|---|---|---|---|
| 5,331,508 A * | 7/1994 | Hosoi | ................. | E05B 65/5276 174/363 |
| 5,478,032 A * | 12/1995 | Miller | ................... | H02B 1/044 174/503 |
| 5,482,232 A * | 1/1996 | Wynn | .................... | A47B 81/06 248/205.1 |
| 5,709,358 A * | 1/1998 | Kubota | .................. | B60K 37/00 248/27.1 |
| 6,227,500 B1* | 5/2001 | Inaba | ..................... | B60K 37/02 248/27.1 |
| 6,250,706 B1* | 6/2001 | Davis, Jr. | ............... | B60K 37/00 174/72 A |

FOREIGN PATENT DOCUMENTS

| | | |
|---|---|---|
| JP | S59-109915 U | 7/1984 |
| JP | 2009-255871 A | 11/2009 |
| JP | 2013-047075 A | 3/2013 |
| JP | 2014-172457 A | 9/2014 |

* cited by examiner

*Primary Examiner* — Gwendolyn W Baxter
(74) *Attorney, Agent, or Firm* — Oliff PLC

(57) ABSTRACT

An instrument panel includes a panel body in which an opening is provided to extend from a fitting part for the display device to a part located on a display rear side with respect to the fitting part, when a display front side is defined as a side toward which a display surface of the display device faces in the instrument panel in which the display device is fitted, the display rear side is defined as a side opposite to the display front side, and the fitting part is defined as a part in which the display device is fitted in the instrument panel; and a cover that is attached to the panel body and that covers, from an outside of the panel body, a part of the opening that is located on the display rear side with respect to the fitting part.

4 Claims, 6 Drawing Sheets

INSTRUMENT PANEL

INCORPORATION BY REFERENCE

The disclosure of Japanese Patent Application No. 2016-185786 filed on Sep. 23, 2016 including the specification, drawings and abstract is incorporated herein by reference in its entirety.

BACKGROUND

1. Technical Field

The disclosure relates to an instrument panel in which a display device is fitted.

2. Description of Related Art

An instrument panel, to which an outlet of an air-conditioner, meters and gauges are fitted, is installed in a part of a vehicle cabin of an automobile (vehicle) on a vehicle body front side. A display device that displays various pieces of information such as navigation information may be fitted in an opening that is provided in an outer surface of the instrument panel, as described in Japanese Patent Application Publication No. 2013-047075 (JP 2013-047075 A). It is described in the document that the display device is displaced toward the vehicle body front side to reduce an impact when an occupant or the like collides with the display device.

SUMMARY

In the case where, for example, a large-screen display device is adopted, the display device may be fitted in the instrument panel so as to project above an upper edge of the opening that is provided in the instrument panel. In this case, when the display device is about to be displaced toward the vehicle body front side due to a collision, the display device may interfere with the upper edge of the opening. As a result, the displacement of the display device is limited, and thus, it may become impossible to sufficiently reduce an impact.

The disclosure provides an instrument panel that can more appropriately reduce an impact when an occupant or the like collides with a display device.

An instrument panel according to an aspect of the disclosure is configured such that a display device is fitted in the instrument panel. The instrument panel includes a panel body in which an opening is provided to extend from a fitting part for the display device to a part located on a display rear side with respect to the fitting part, when a display front side is defined as a side toward which a display surface of the display device faces in the instrument panel in which the display device is fitted, the display rear side is defined as a side opposite to the display front side, and the fitting part is defined as a part in which the display device is fitted in the instrument panel; and a cover that is attached to the panel body and that covers, from an outside of the panel body, a part of the opening that is located on the display rear side with respect to the fitting part. In the instrument panel, the fitting part for the display device is a part of the opening provided in the panel body, the part being not covered by the cover.

In the instrument panel configured as described above, when an occupant or the like collides with the display device from the display front side, the display device is displaced toward the display rear side to release a load, and thus, an impact resulting from the collision can be reduced. In the instrument panel, the cover is attached to the part of the display device that is located on the display rear side. When the load resulting from the collision is applied to the display device, a pressing force toward the display rear side is applied to the cover as well, via the display device. In the instrument panel, the cover and the panel body are separate bodies. Therefore, when a large pressing force is applied to the cover, the cover is separated from the panel body. In the panel body of the instrument panel, the opening is provided to extend from the fitting part for the display device to the part located on the display rear side with respect to the fitting part. When the cover is separated from the panel body, a space where the display device can be displaced is formed on the display rear side with respect to the display device (i.e., a space is formed behind the display device). Therefore, in the instrument panel, the display device can be more greatly displaced toward the display rear side at the time of a collision. Accordingly, the instrument panel configured as described above can more appropriately reduce an impact when the occupant or the like collides with the display device.

The instrument panel may further include a string member configured such that one end of the string member is engaged with the cover and another end of the string member is engaged with the panel body when the cover is separated from the panel body. With the configuration, the cover can be restrained from coming into contact with the occupant or another member in a vehicle cabin by limiting the movements of the cover that has been separated from the panel body. For example, the one end of the string member may be fixed to a clip portion that is fixed to the cover and that is engaged with an engagement hole provided in the panel body, and the other end of the string member may be provided with an anchor portion that is engaged with the engagement hole when the cover is separated from the panel body. That is, the string member may be a member constituting a tether part of a so-called tether clip.

The cover may be attached to the panel body of the instrument panel by engaging a pin protruding from a surface of the cover with a pin hole provided in the panel body, the surface of the cover facing the panel body. In this case, the force with which the cover is fixed to the panel body can be appropriately set such that the cover is separated from the panel body at the time of a collision, by adjusting the fitting of the pin to the pin hole.

Furthermore, in the instrument panel, a pin that is engaged with the panel body may be provided at an end portion of the cover on the display rear side, and a pin that is engaged with the display device may be provided at an end portion of the cover on the display front side. In this case, the end portion of the cover, which is engaged with the display device, on the display front side is pressed upward due to a pressing force from the display device at the time of a collision. Then, as a result, a pulling load is applied to the pin that engages the cover with the panel body, and thus, the cover is separated from the panel body.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The instrument panel according to an embodiment of the disclosure will be described hereinafter in detail with reference to FIGS. 1 to 8. The instrument panel according to the present embodiment is provided in a front portion of a vehicle cabin in a vehicle (an automobile) so as to face a front seat.

Figure 1:
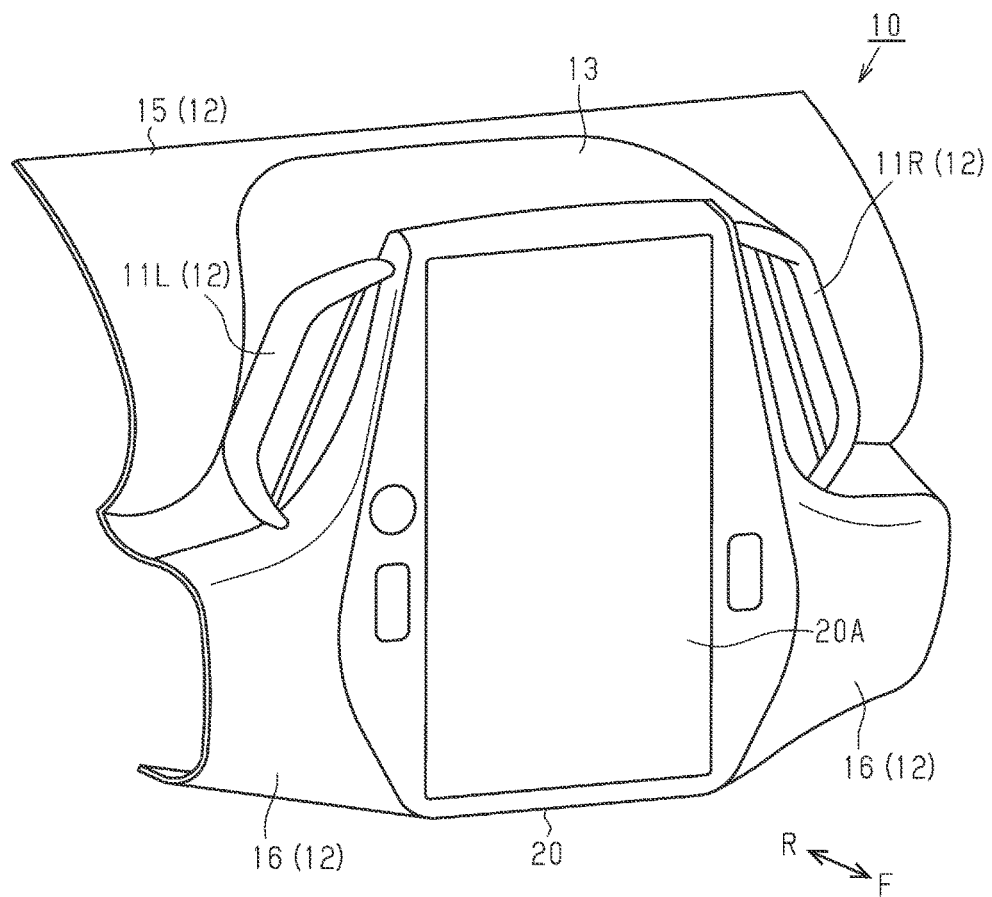
FIG. 1 is a perspective view of a fitting part for a display device and the vicinity of the fitting part in an instrument panel according to an embodiment.

FIG. 1 shows a central part of an instrument panel 10 according to the present embodiment in a vehicle width direction. As shown in FIG. 1, a display device 20 configured to display various pieces of information such as navigation information and so on is fitted in the instrument panel 10. Outlets 11R and 11L of an air-conditioner are provided on respective sides of a part of the instrument panel 10 where the display device 20 is installed. In the following description, a side toward which a display surface 20A of the display device 20 faces will be referred to as a display front side F, and a side opposite to the display front side F will be referred to as a display rear side R, in the instrument panel 10 in which the display device 20 is fitted. The display front side F corresponds to a vehicle rear side, and the display rear side R corresponds to a vehicle front side.

Figure 2:
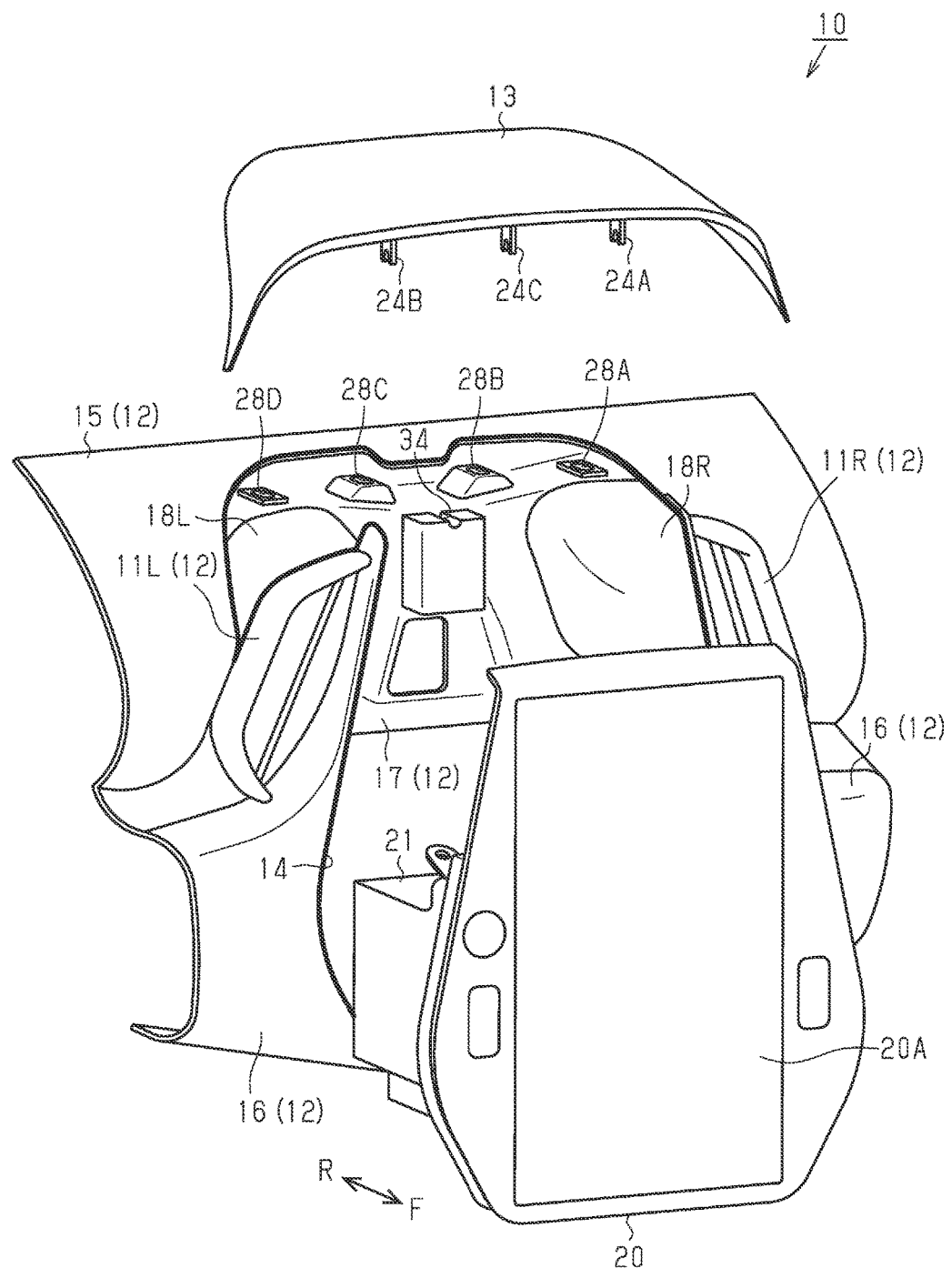
FIG. 2 is an exploded perspective view of the fitting part for the display device and the vicinity of the fitting part in the instrument panel according to the embodiment in a state where the display device and a cover removed are removed.

As shown in FIG. 2, the instrument panel 10 includes a panel body 12 and a cover 13. The panel body 12 includes an upper member 15 constituting an upper surface of the instrument panel 10, a lower member 16 constituting a lower surface of the instrument panel 10, an inner member 17 constituting an inner part of the instrument panel 10, the outlets 11R and 11L of the air-conditioner, and so on. The outlets 11R and 11L and the lower member 16 are attached to a surface of the upper member 15 on the display front side F. The inner member 17 is attached to a reverse surface of the upper member 15. Flow ducts 18R and 18L of the air-conditioner are connected to the outlets 11R and 11L respectively through an inner portion of the panel body 12.

The panel body 12 is provided with an opening 14. Moreover, the cover 13 is attached to the panel body 12 so as to cover, from the outside of the panel body 12, a part of the opening 14 that is located on the display rear side R. In the drawing, an outer edge of the opening 14 is indicated by a thick line.

Figure 3:
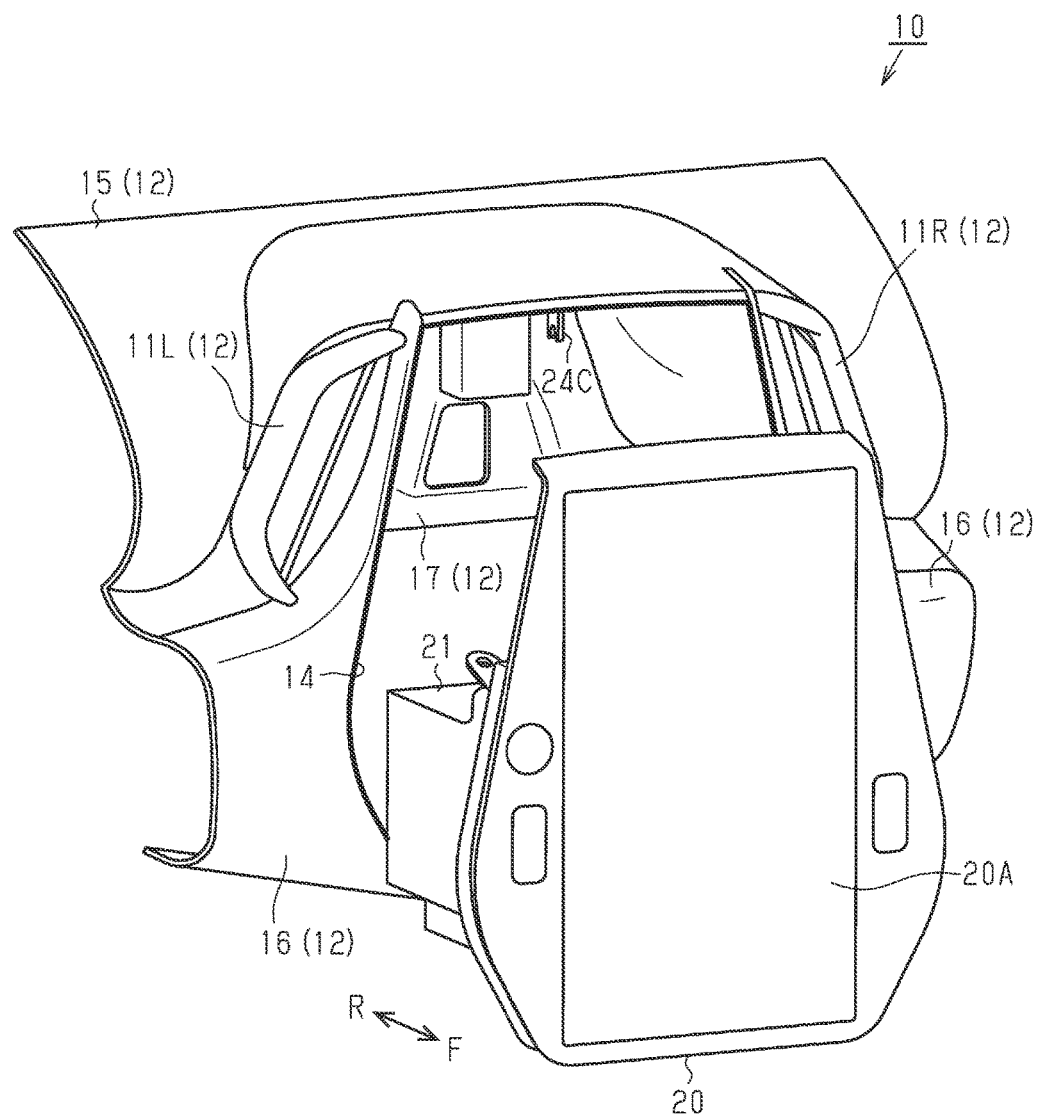
FIG. 3 is an exploded perspective view of the fitting part for the display device and the vicinity of the fitting part in the instrument panel according to the embodiment in the state where the display device is removed.

As shown in FIG. 3, in a state where the cover 13 is attached to the panel body 12, the part of the opening 14 that is located on the display rear side R is covered by the cover 13. The display device 20 is fitted in a part of the opening 14 that is not covered by the cover 13. That is, in the instrument panel 10, a part whose outer edge is indicated by a thick line in the drawing is a fitting part in which the display device 20 is fitted (hereinafter, the fitting part in which the display device 20 is fitted may be referred to as "the fitting part for the display device 20"). A control unit 21 configured to control the display device 20 is attached to a lower portion of a reverse side of the display device 20.

Figure 4:
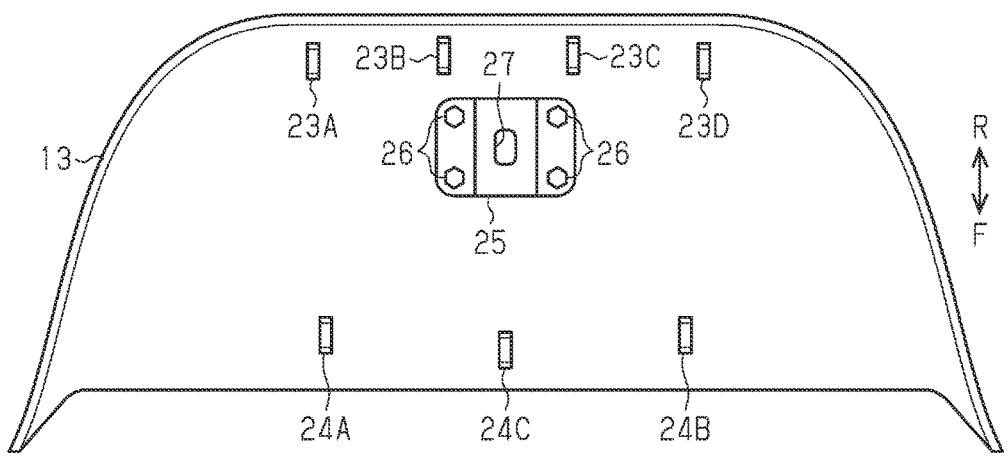
FIG. 4 is a plan view showing the structure of a reverse surface of the cover, which is a component of the instrument panel according to the embodiment.

FIG. 4 shows the structure of a surface of the cover 13 that faces the panel body 12 (which will be referred to hereinafter as a reverse surface of the cover 13). As shown in the drawing, four pins 23A to 23D that protrude from the reverse surface of the cover 13 are provided at an end portion of the reverse surface of the cover 13 that is located on the display rear side R when the cover 13 is attached to the panel body 12 (the end portion will be referred to hereinafter as a rear end portion of the cover 13). Three pins 24A to 24C that protrude from the reverse surface of the cover 13 are provided at an end portion of the reverse surface of the cover 13 that is located on the display front side F when the cover 13 is attached to the panel body 12 (the end portion will be referred to hereinafter as a front end portion of the cover 13).

A metal bracket 25 is fixed to the reverse surface of the cover 13 by bolts 26. An attachment hole 27 for a tether clip 30, which will be described later, is provided at a central portion of the bracket 25.

Figure 5:
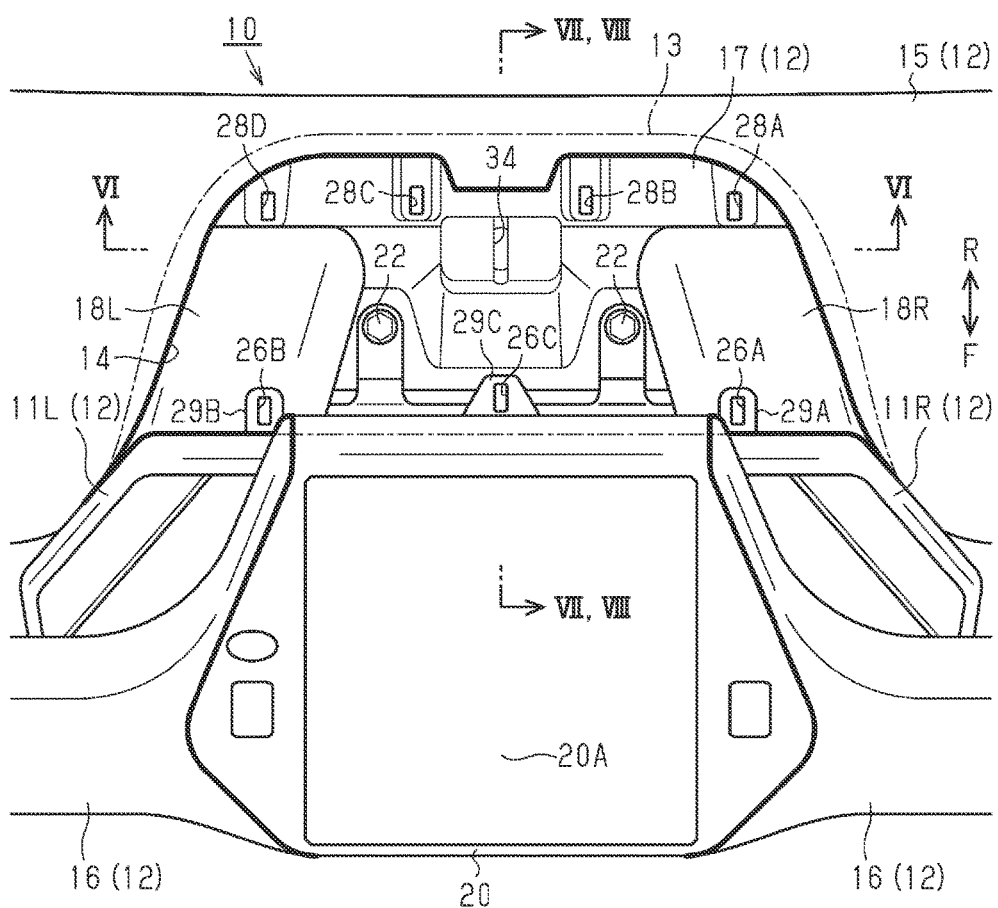
FIG. 5 is a plan view of the fitting part for the display device and the vicinity of the fitting part in the instrument panel according to the embodiment in the state where the cover is removed, as viewed from above a vehicle body.

FIG. 5 shows a planar structure of the fitting part for the display device 20 and the vicinity of the fitting part in the instrument panel 10 in a state where the cover 13 is removed, as viewed from above the vehicle body. The display device 20 is fixed to the panel body 12 through the fastening of the control unit 21 to the inner member 17 by bolts 22. In contrast, the display device 20 itself simply contacts an edge of the opening 14, and is fitted in the instrument panel 10 without being directly fixed to the panel body 12.

Four pin holes 28A to 28D are provided in an upper surface of a part of the inner member 17, the part corresponding to an end portion of the opening 14 on the display rear side R. When the cover 13 is attached to the panel body 12, the four pins 23A to 23D that are provided at the rear end portion of the cover 13 are engaged with the pin holes 28A to 28D respectively.

Engagement portions 29A and 29B are provided at upper portions of the outlets 11R and 11L respectively, so as to protrude toward the display rear side R. The engagement portions 29A and 29B are provided with pin holes 26A and 26B, respectively. When the cover 13 is attached to the panel body 12, two of the three pins that are provided at the front end portion of the cover 13, namely, the pins 24A and 24B that are located at outer sides in a width direction are engaged with the pin holes 26A and 26B, respectively.

Furthermore, an engagement portion 29C is provided at an upper portion of the display device 20 so as to protrude toward the display rear side R. The engagement portion 29C is provided with a pin hole 26C. When the cover 13 is attached to the panel body 12, one of the three pins 24A to 24C that are provided at the front end portion of the cover 13, namely, the pin 24C that is located at the center in the width direction is engaged with this pin hole 26C.

As described hitherto, the cover 13 is engaged with the inner member 17 and the outlets 11R and 11L of the panel body 12, by the pins 23A to 23D, 24A and 24B that are provided at the rear end portion and front end portion of the cover 13. Furthermore, the cover 13 is also engaged with the display device 20 through the pin 24C that is provided at the front end portion of the cover 13. When a pulling load equal to or larger than a given value is applied to the pins 23A to 23D and 24A to 24C, they are disengaged from the pin holes 28A to 28D and 26A to 26C with which they are engaged respectively.

Figure 6:
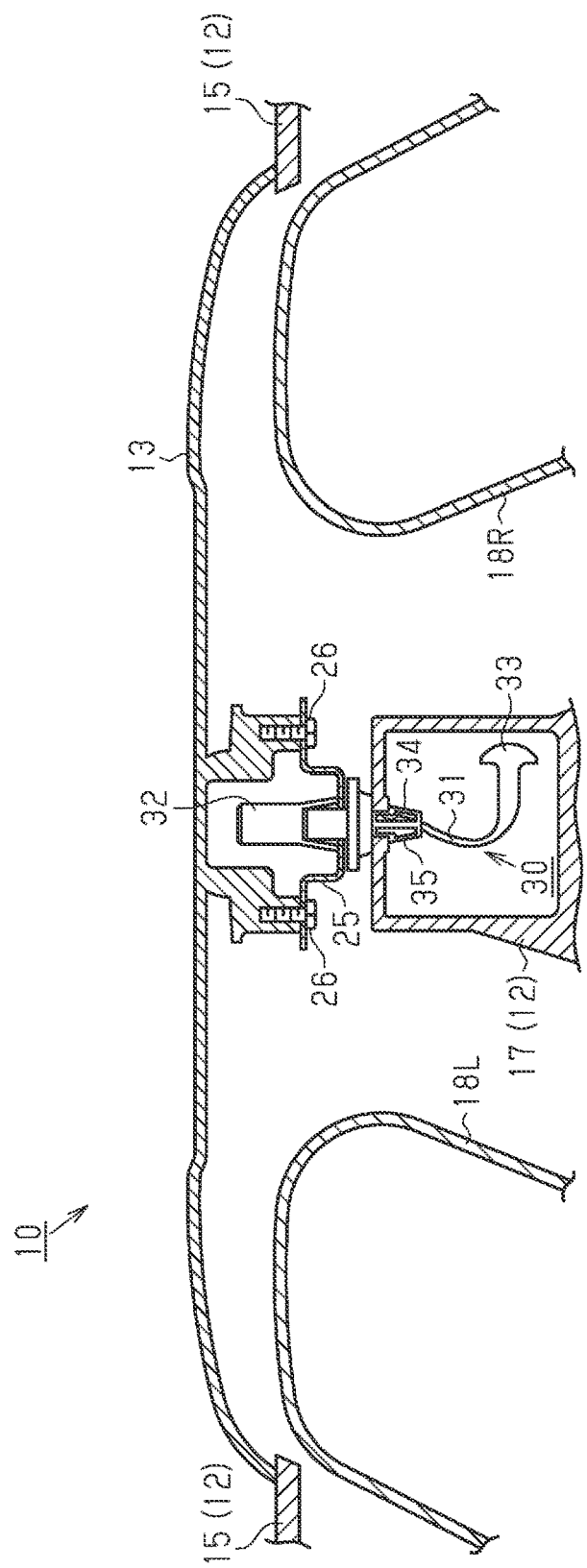
FIG. 6 is a sectional view of the instrument panel according to the embodiment along a line VI-VI of FIG. 5.

FIG. 6 shows the sectional structure of an upper portion of the instrument panel 10 along a line VI-VI of FIG. 5. The cover 13 is connected to the panel body 12 via the tether clip 30 shown in the drawing.

The tether clip 30 includes a tether 31 that is a string-shaped member (a string member) made of a material having flexibility. One end of the tether 31 is fixed to a clip portion 32 that is fixed in the attachment hole 27 of the bracket 25 of the cover 13. The other end of the tether 31 is provided with a barbed anchor portion 33.

An engagement hole 34 in the form of a slit is provided at a part of the inner member 17 that faces the clip portion 32 fixed in the attachment hole 27 when the cover 13 is attached to the panel body 12. The tether clip 30 is fitted to the instrument panel 10, with the tether 31 passed through the engagement hole 34. Furthermore, the clip portion 32 is provided with a pin 35 that engages with the engagement hole 34. When a pulling load equal to or larger than a given value is applied to the pin 35, the pin 35 is disengaged from the engagement hole 34. The width of a barbed part of the anchor portion 33 is larger than the width of the engagement hole 34 in the form of a slit. Therefore, even when receiving a pulling load, the tether 31 passed through the engagement hole 34 is not disengaged from the engagement hole 34, because the barbed part of the anchor portion 33 is engaged with the engagement hole 34.

Subsequently, the operation and effect of the instrument panel 10 configured as described above will be described. In the vehicle (automobile) in which the instrument panel 10 as described above is provided, an occupant or the like (which will be referred to hereinafter as a collision object M) may collide with the display device 20. Due to the layout of the vehicle cabin, the collision object M is more likely to collide with the upper portion of the display device 20 than with a lower portion of the display device 20.

Figure 7:
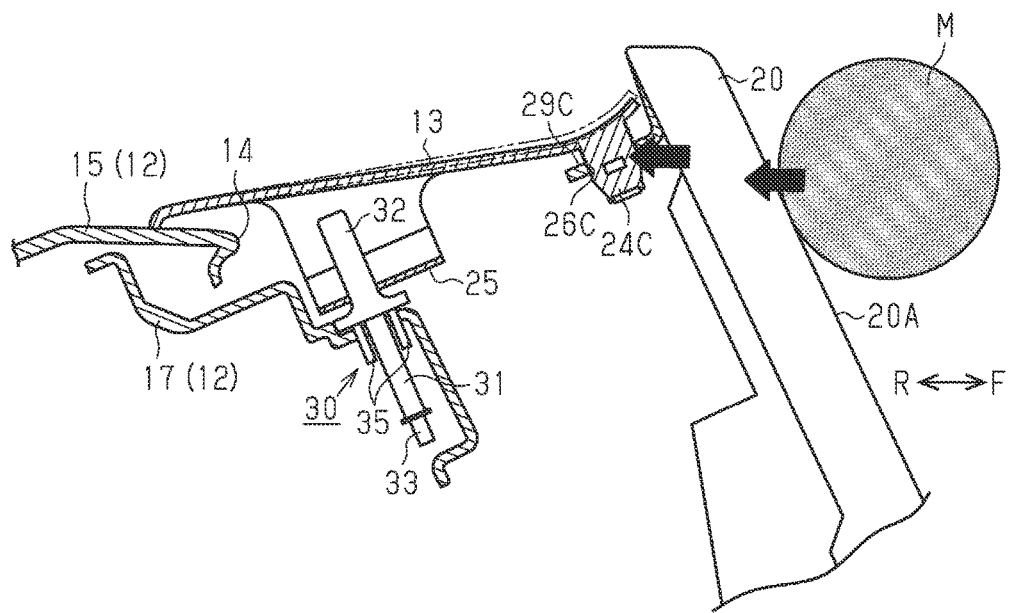
FIG. 7 is a sectional view of the instrument panel according to the embodiment along a line VII, VIII-VII, VIII of FIG. 5, immediately after a collision.

FIG. 7 shows a state where the collision object M has just collided with the upper portion of the display device 20 from the display front side F. The upper portion of the display device 20 that has received a load from the display front side F due to the collision is displaced toward the display rear side R to release the load. It should be noted, however, that the cover 13 is attached to the part of the display device 20 that is located on the display rear side R in the instrument panel 10, and the cover 13 hinders the display device 20 from being displaced at this time as long as the cover 13 exists in that part.

The cover 13 is engaged, at the front end portion thereof, with the display device 20 via the pin 24C. Therefore, when a load transmitted from the display front side F as a result of a collision is applied to the display device 20, the load is transmitted to the front end portion of the cover 13 via the pin 24C. That is, the front end portion of the cover 13 receives a pressing force from the display device 20 at this time.

The cover 13 is engaged, at the rear end portion thereof and the like, with the panel body 12. Therefore, when a pressing force as described above is applied to the cover 13, the center of the front end portion of the cover 13 that is provided with the pin 24C is pressed upward as indicated by an alternate long and two short dashes line in the drawing. As a result, a pulling load is applied to the pins 23A to 23D, 24A to 24C and 35, which engage the cover 13 with the panel body 12.

As described above, when a pulling load equal to or larger than a given value is applied to the pins 23A to 23D, 24A to 24C and 35, the pins are disengaged from the pin holes 28A to 28D, 26A and 26B and the engagement hole 34 with which they are engaged respectively. Therefore, when the pressing force received by the cover 13 from the display device 20 at the time of a collision becomes equal to or larger than a given value, the pins 23A to 23D, 24A to 24C and 35 are disengaged, and thus, the cover 13 is separated from the panel body 12 (in other words, the cover 13 is moved away from the panel body 12). That is, upon receiving a pressing force equal to or larger than a prescribed value from the display device 20, the cover 13 is separated from the panel body 12.

Figure 8:
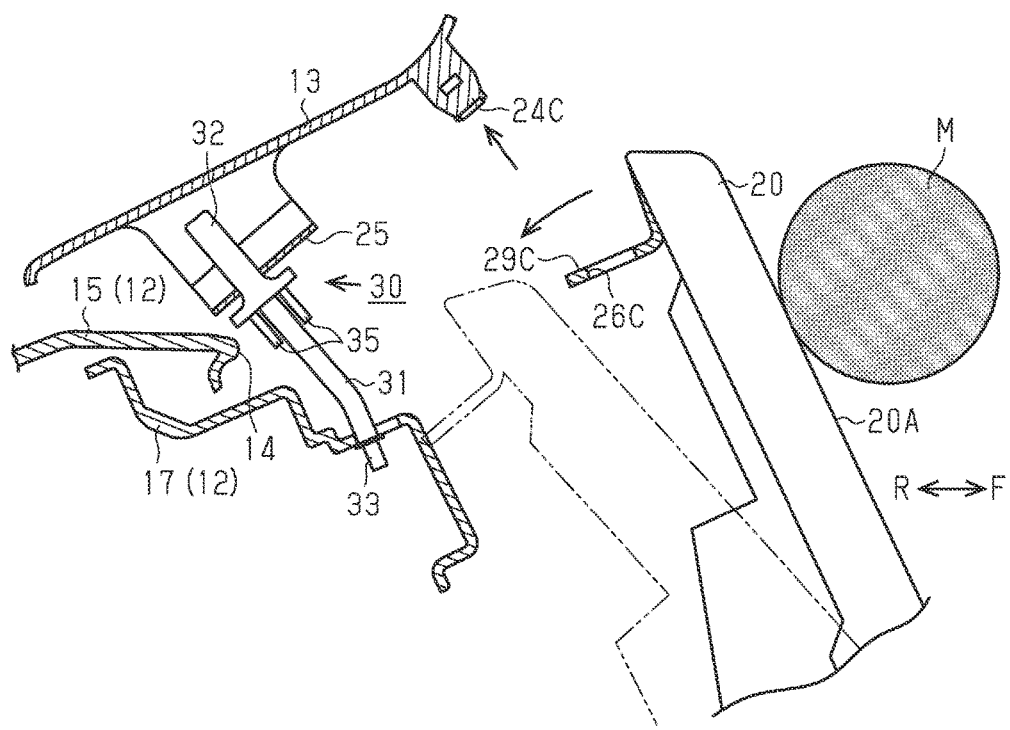
FIG. 8 is a sectional view of the instrument panel according to the embodiment along the line VII, VIII-VII, VIII of FIG. 5, in a state where the cover is separated after a collision.

FIG. 8 shows a state where the cover 13 has been separated from the panel body 12. As described above, in the panel body 12, the opening 14 is provided to extend from the fitting part for the display device 20 to a part located on the display rear side R with respect to the fitting part. Therefore, when the cover 13, which covers the part of the opening 14 that is located on the display rear side R with respect to the fitting part for the display device 20, is separated from the panel body 12, a space where the upper portion of the display device 20 can be displaced is formed behind the upper portion of the display device 20. Then, as a result, the upper portion of the display device 20 with which the collision object M has collided is greatly displaced toward the display rear side R, and thus, the load resulting from the collision can be released. As described hitherto, the instrument panel 10 according to the present embodiment can appropriately reduce an impact when the occupant or the like collides with the display device 20.

When the cover 13 is separated from the panel body 12 by a given distance, the anchor portion 33 of the tether clip 30 is engaged with the engagement hole 34 that is provided in the inner member 17 of the panel body 12, and thus, the cover 13 cannot move away from the panel body 12 any further. Therefore, the cover 13 that has been separated and moved away from the panel body 12 is restrained from colliding with the occupant or another member in the vehicle cabin.

The embodiment can also be carried out after being changed as follows. In the embodiment, the cover 13 that has been separated from the panel body 12 at the time of a collision is restrained from moving away from the panel body 12 any further, by the tether clip 30 that is fixed to the cover 13 and that includes the clip portion 32 that is engaged with the engagement hole 34 provided in the panel body 12. Even in the case where the tether clip 30 is not used, by providing a string member configured such that one end of the string member is engaged with the cover 13 and another end of the string member is engaged with the panel body 12 when the panel body 12 is separated from the cover 13, it is possible to restrain the cover 13 from moving away from the panel body 12 any further. For example, the cover 13 and the panel body 12 may be connected to each other by a string-shaped member such as a wire.

In the case where, for example, the moving range of the cover 13 in the vehicle cabin at the time when the cover 13 is separated from the panel body 12 is limited to a range in which a collision of the cover 13 does not cause a problem, the string member as described above, which restrains the cover 13 from moving any further at the time when the cover 13 is separated from the panel body 12, may be omitted.

Two of the three pins 24A to 24C that are provided at the front end portion of the cover 13, namely, the pins 24A and 24B that are located at outer sides in the width direction, and the pin holes 26A and 26B with which the pins are engaged may be omitted, as long as the cover 13 can be fixed to the panel body 12 such that the cover 13 can be separated from the panel body 12 at the time of a collision. In this case as well, as long as the pins 23A to 23D that are engaged with the panel body 12 are provided at the rear end portion of the cover 13 and the pin 24C that is engaged with the display device 20 is provided at the front end portion of the cover 13, the front end portion of the cover 13 is pressed upward due to a pressing force from the display device 20 at the time of a collision. Therefore, the pins 23A to 23D, which engage the cover 13 with the panel body 12, are likely to be disengaged at the time of a collision.

In the embodiment, the pins 23A to 23D that are engaged with the panel body 12 are provided at the rear end portion of the cover 13, and the pin 24C that is engaged with the display device 20 is provided at the front end portion of the cover 13. Among these pins, the pin 24C, which engages the front end portion of the cover 13 with the display device 20, may be omitted. The positions or number of pins that engage the cover 13 with the panel body 12 may be changed. In this case as well, as long as the cover 13 receives a pressing force from the display device 20, for example, through contact between the front end of the cover 13 and the display device 20, the front end portion of the cover 13 is pressed upward by the pressing force, and a pulling load is applied to the pins. Therefore, the cover 13 can be separated from the panel body 12 at the time of a collision.

The cover 13 may be attached to the panel body 12 by means other than pin engagement, for example, adhesion or welding. In this case as well, as long as the cover 13 is configured to be separated from the panel body 12 upon receiving a pressing force equal to or larger than a prescribed value from the display device 20, the impact applied to the display device 20 can be reduced by permitting displacement for releasing the load applied at the time of a collision.

What is claimed is:

1. An instrument panel that is configured such that a display device is fitted in the instrument panel, the instrument panel comprising:
    a panel body in which an opening is provided to extend from a fitting part for the display device to a part located on a display rear side with respect to the fitting part, when a display front side is defined as a side toward which a display surface of the display device faces in the instrument panel in which the display device is fitted, the display rear side is defined as a side opposite to the display front side, and the fitting part is defined as a part in which the display device is fitted in the instrument panel;
    a cover that is attached to the panel body and that covers, from an outside of the panel body, a part of the opening that is located on the display rear side with respect to the fitting part; and
    a string member configured such that one end of the string member is engaged with the cover and another end of the string member is engaged with the panel body when the cover is separated from the panel body.

2. The instrument panel according to claim 1, wherein:
    the one end of the string member is fixed to a clip portion that is fixed to the cover and that is engaged with an engagement hole provided in the panel body; and
    the other end of the string member is provided with an anchor portion that is engaged with the engagement hole when the cover is separated from the panel body.

3. An instrument panel that is configured such that a display device is fitted in the instrument panel, the instrument panel comprising:
    a panel body in which an opening is provided to extend from a fitting part for the display device to a part located on a display rear side with respect to the fitting part, when a display front side is defined as a side toward which a display surface of the display device faces in the instrument panel in which the display device is fitted, the display rear side is defined as a side opposite to the display front side, and the fitting part is defined as a part in which the display device is fitted in the instrument panel; and
    a cover that is attached to the panel body and that covers, from an outside of the panel body, a part of the opening that is located on the display rear side with respect to the fitting part,
    wherein the cover is attached to the panel body by engaging a pin protruding from a surface of the cover with a pin hole provided in the panel body, the surface of the cover facing the panel body.

4. An instrument panel that is configured such that a display device is fitted in the instrument panel, the instrument panel comprising:
    a panel body in which an opening is provided to extend from a fitting part for the display device to a part located on a display rear side with respect to the fitting part, when a display front side is defined as a side toward which a display surface of the display device faces in the instrument panel in which the display device is fitted, the display rear side is defined as a side opposite to the display front side, and the fitting part is defined as a part in which the display device is fitted in the instrument panel; and
    a cover that is attached to the panel body and that covers, from an outside of the panel body, a part of the opening that is located on the display rear side with respect to the fitting part,
    wherein:
    a pin that is engaged with the panel body is provided at an end portion of the cover on the display rear side; and
    a pin that is engaged with the display device is provided at an end portion of the cover on the display front side.

* * * * *